(12) United States Patent
Xu et al.

(10) Patent No.: US 12,529,667 B2
(45) Date of Patent: Jan. 20, 2026

(54) METHOD FOR INCREASING GAS SELECTION FUNCTIONS OF MULTIFUNCTIONAL GAS-SENSITIVE SENSOR, AND GAS-SENSITIVE SENSOR (71) Applicant: SHENZHEN TECHNOLOGY UNIVERSITY, Guangdong (CN)

(72) Inventors: Fang Xu, Guangdong (CN); Hopui Ho, Guangdong (CN)

(73) Assignee: SHENZHEN TECHNOLOGY UNIVERSITY, Shenzhen (CN)

( * ) Notice: Subject to any disclaimer, the term of this patent is extended or adjusted under 35 U.S.C. 154(b) by 331 days.

(21) Appl. No.: 18/503,207

(22) Filed: Nov. 7, 2023

(65) Prior Publication Data

US 2024/0068972 A1 Feb. 29, 2024

Related U.S. Application Data (63) Continuation of application No. PCT/CN2022/087113, filed on Apr. 15, 2022.

(30) Foreign Application Priority Data

May 7, 2021 (CN) .......................... 202110495104.4

(51) Int. Cl.
*G01N 27/12* (2006.01)
(52) U.S. Cl.
CPC .................................. *G01N 27/127* (2013.01)
(58) Field of Classification Search
None
See application file for complete search history.

(56) References Cited

U.S. PATENT DOCUMENTS

2020/0249237 A1* 8/2020 Deans ...................... G07D 7/14
2022/0099643 A1* 3/2022 Miao ....................... B82Y 40/00

FOREIGN PATENT DOCUMENTS

CN 111470480 A * 7/2020 ............. B82Y 15/00
CN 110057783 B * 6/2021 ......... G01N 21/4788

OTHER PUBLICATIONS

Wnag, Wei et al., Enhanced Acetone Sensing Performance of Au Nanoparticles Functionalized Flower-like ZnO, Rare Metal Materials and Engineering, Aug. 2013, pp. 1699-1702, vol. 42, No. 8.
Fang, Liang et al., Study on NO2 gas sensing characteristics of In—doped ZnO thin films prepared by RF magnetron sputtering, Journal of Chongqing University, Sep. 2009, pp. 1002-1005 and 1015, vol. 32, No. 9.

(Continued)

*Primary Examiner* — Stephanie E Bloss
*Assistant Examiner* — Diana Hancock (57) ABSTRACT

Disclosed in the present application are a method for increasing gas selection functions of a multifunctional gas sensor, and a gas sensor. The method for increasing gas selection functions of a multifunctional gas sensor of the present application comprises: forming a noble metal nanoparticle modification layer on a surface of a semiconductor gas-sensitive material layer of a probe of a gas sensor, such that a single probe of the gas sensor can implement the selective detection and selective regulation of at least three gases in an operating temperature range of 0-400° C.

3 Claims, 6 Drawing Sheets (56) References Cited

OTHER PUBLICATIONS

Fang Xu et al., A rule for operation temperature selection of a conductometric VOC gas sensor based on ZnO nanotetrapods, Journal of Alloys and Compounds, 2021, pp. 1-9, vol. 858.

Fang Xu et al., Light-activated gas sensing activity of ZnO nanotetrapods enhanced by plasmonic resonant energy from Au nanoparticles, Sensors and Actuators B: Chemical, 2018, pp. 709-716, vol. 259.

Notification of Grant of counterpart Chinese Patent Application No. 202110495104.4 issued on Nov. 29, 2022.

1st Office Action of counterpart Chinese Patent Application No. 202110495104.4 issued on Jan. 5, 2022.

2nd Office Action of counterpart Chinese Patent Application No. 202110495104.4 issued on Sep. 5, 2022.

International Search Report of PCT Patent Application No. PCT/CN2022/087113 issued on Jun. 23, 2022.

\* cited by examiner

METHOD FOR INCREASING GAS SELECTION FUNCTIONS OF MULTIFUNCTIONAL GAS-SENSITIVE SENSOR, AND GAS-SENSITIVE SENSOR

CROSS REFERENCE TO RELATED APPLICATIONS

The present application is a Continuation Application of PCT Application No. PCT/CN2022/087113 filed on Apr. 15, 2022, which claims the benefit of Chinese Patent Application No. 202110495104.4 filed on May 7, 2021. All the above are hereby incorporated by reference in their entirety.

TECHNICAL FIELD

The present disclosure relates to gas sensors, and in particular to methods for increasing gas selection functions of a multifunctional gas sensor.

BACKGROUND

As the foundation and key functional unit of the Internet of Things and artificial intelligence, sensors are considered to be one of the three pillars of modern information technology. Gas sensors play an important role in industrial manufacturing, environmental monitoring, drug diagnosis, personal safety, and other fields. Semiconductor-based resistive gas sensors have advantages such as small size, simple structure, high response, and low price.

The principle of semiconductor-based resistive gas sensor for detecting gases is that the gases are adsorbed and reacted on their surfaces and caused their resistance change. However, the working environment for gas detection is generally complex, and a gas sensor with a single probe has cross-sensitivity problems in detecting multi-component mixed gases, making it difficult to selectively identify target gases in interfering gases. Therefore, many researches are committed to improving the gas selectivity of semiconductor-based resistive gas sensors by methods such as material preparation and adding filter membranes. Also, how to improve the gas selectivity of a gas sensor and expand its selection of gas types is an important technology, which is also a research focus and difficulty in the field of gas sensors.

The currently reported scheme for achieving selective detection of multiple gases using a single probe mainly relies on temperature regulation to achieve gas selectivity. However, existing research has only achieved selective regulation of two gases; that is, selective response to gas X at temperature A, followed by selective response to gas Y by changing the temperature to B.

In order to selectively detect more than two gases, the current technology is to integrate multiple gas sensor elements with different sensitive characteristics into an array, test the response performance to gases of gas sensor elements made of different materials, and conduct a large amount of data analysis and multi-data comparison analysis to identify and detect more than two gases. However, such devices are not single-probe devices, and have problems such as large size, complex structure, long and cumbersome testing process and data processing.

In summary, existing gas sensors, especially single-probe gas sensors, can only achieve dual-function gas selectivity at most, that is, only two types of gas can be selectively detected through temperature regulation by the gas sensors. Moreover, this method of achieving dual-function gas selectivity through temperature regulation with a large temperature regulation range and an increased operating temperature of the devices may result in a series of safety hazards and energy consumption defects. There is currently no studies or reports on achieving selectivity to more than two gases by a gas sensor with a single probe.

SUMMARY

A purpose of the present disclosure is to provide methods for increasing gas selection functions of a multifunctional gas sensor, as well as gas sensors with selectivity to more than two gases.

In order to achieve the above purpose, the present disclosure adopts the following technical solutions.

A method for increasing gas selection functions of a multifunctional gas sensor disclosed according to an aspect of the present disclosure may include: forming a noble metal nanoparticle modification layer on the surface of a semiconductor gas-sensitive material layer on a probe of the gas sensor, such that a single probe of the gas sensor is capable of implementing selectively detection of at least three gases in an operating temperature range of 0-400° C. The noble metal nanoparticle modification layer may refer to a layer formed by depositing noble metal nanoparticles.

It should be noted that the present disclosure has found through research that modifying the surface of the semiconductor gas-sensitive material layer with noble metal nanoparticles can increase the function of gas selection for a single probe, enabling selectively detection of at least three gases in the operating temperature range of 0-400° C.; thereby improving gas selectivity of a gas sensor and expanding the types of gas it can detect. It can be understood that the key to the present disclosure lies in the research finding that modifying the semiconductor gas-sensitive material with noble metal nanoparticles can increase the types of gas selected, thereby enabling the selection and detection of at least three gases. As for the specific noble metal nanoparticles, reference can be made to existing noble metal nanomaterials; specific semiconductor gas-sensitive materials can also refer to existing gas sensors; and the substrate of the probe of a gas sensor can also refer to existing gas sensors, such as ceramic tubes, silicon wafers, glass, plastic, etc. However, in order to ensure the gas selection of a gas sensor, in one embodiment of the present disclosure, the noble metals, semiconductor gas-sensitive materials and substrate are all carefully defined. For details, please refer to the following technical solutions.

In an embodiment of the present disclosure, the noble metal nanoparticles may be at least one of gold nanoparticles, silver nanoparticles, platinum nanoparticles, and palladium nanoparticles.

Preferably, the noble metal nanoparticles may be gold nanoparticles.

In an embodiment of the present disclosure, the thickness of the noble metal nanoparticle modification layer may be 1-10 nm.

In an embodiment of the present disclosure, the noble metal nanoparticle modification layer may be formed on the surface of the semiconductor gas-sensitive material layer through the following methods:

(1) depositing a 1-10 nm noble metal film on the surface of the semiconductor gas-sensitive material layer by using magnetic sputtering, and rapidly annealing at high temperature to form split noble metal nanoparticles, thereby obtaining the noble metal nanoparticle modification layer; wherein, high temperature may refer to a temperature between 200° C. and 600° C., preferably approximately 500° C. It can be understood that the purpose of high temperature is to rapidly anneal after high temperature, so that the noble metal film is split into nanoparticles. Too low a temperature cannot achieve the effect of splitting the magnetic sputtered noble metal film into nanoparticles, while too high a temperature can cause the semiconductor gas-sensitive material to deform and melt the noble metal nanoparticles formed by magnetic sputtering, resulting in achieving the effect of splitting into nanoparticles; as such, a temperature between 200° C. and 600° C. can be used to ensure a desired effect of forming split noble metal nanoparticles. Accordingly, rapid annealing at a high temperature refers to heating at a high temperature of 200° C. to 600° C. for 1-5 minutes, and then rapidly removing and cooling in room temperature or low temperature air below room temperature to rapidly cool it down; or, (2) soaking the probe of the gas sensor coated with the semiconductor gas-sensitive material layer in an ethanol suspension of the noble metal nanoparticles for at least 10 hours to allowing the noble metal nanoparticles to self-assemble onto the surface of the semiconductor gas-sensitive material layer, and heating to remove water and organic matter, thereby obtaining the noble metal nanoparticle modification layer. The condition for heating may be generally between 200° C. and 600° C., preferably around 500° C., and the time for heating may be at least half an hour. The heating temperature here may depend on the semiconductor gas-sensitive material layer and the organic matter contained in the noble metal nanoparticle modification layer; because the purpose is to remove the organic matter, the heating temperature should reach the volatilization temperature of the organic matter.

It should be noted that the two methods for preparing the noble metal nanoparticle modification layer are provided in the present disclosure. In the first method, the magnetic sputtered metal film is quickly annealed to split into nanoparticles in a short period of time, so it is necessary to first raise the temperature to around 500° C., then place the device in for about 3 minutes, and quickly remove and anneal it. The second method is that no requirement for annealing to form nanoparticles due to adoption of nanoparticles, and heating is only used to more tightly combine the self-assembled nanoparticles with the surface of the semiconductor gas-sensitive material layer, and remove moisture and possible organic substances, such as ethanol; accordingly, the device is placed in a furnace, and then heated to around 500° C., and maintained at around 500° C. for half an hour.

It should be understood that the noble metal nanoparticle modification layer in the present disclosure is not a complete airtight film layer, but a surface modification layer formed by attaching the noble metal nanoparticles to the surface of the semiconductor gas-sensitive material layer; therefore, for the metal film formed by magnetron sputtering, high temperature annealing is required to form split noble metal nanoparticles.

In an embodiment of the present disclosure, the semiconductor gas-sensitive material may be a common semiconductor gas-sensitive material, such as at least one of ZnO, $TiO_2$, $WO_3$, $SnO_2$ and $In_2O_3$.

Preferably, the semiconductor gas-sensitive material may be zinc oxide nanotetrapods.

In an embodiment of the present disclosure, the substrate of the probe of the gas sensor may be prepared from at least one of ceramic, silicon wafer, plastic or glass.

Preferably, the substrate of the probe of the gas sensor is a ceramic tube.

More preferably, the substrate of the probe of the gas sensor is an alumina ceramic tube.

In an embodiment of the present disclosure, the at least three gases include formaldehyde, ethanol and acetone.

In an embodiment of the present disclosure, the selectively detection of at least three gases in the operating temperature range of 0-400° C. may comprise: selectively detecting formaldehyde, ethanol and acetone by using characteristics of the highest response to a certain gas at different operating temperatures by the gas sensor the characteristics including the highest response to formaldehyde at an operating temperature below 200° C. by the gas sensor, the highest response to ethanol at an operating temperature between 200° C. and 340° C. by the gas sensor and the highest response to acetone at an operating temperature range of 400° C. by the gas sensor.

A gas sensor disclosed according to another aspect of the present disclosure may include a probe of the gas sensor, a surface of a substrate of the probe of the gas sensor being coated with a semiconductor gas-sensitive material layer, wherein the surface of the semiconductor gas-sensitive material layer is decorated with a noble metal nanoparticle modification layer.

It should be noted that the surface of the semiconductor gas-sensitive material layer is modified with noble metal nanoparticles in the present disclosure, such that the gas sensor disclosed in the present disclosure can achieve selectively detection of at least three gases in the operating temperature range of 0-400° C. with only a single probe; thereby enhancing the gas selectivity of the gas sensor and expanding the types of gas it can select.

In an embodiment of the present disclosure, in the noble metal nanoparticle modification layer of the gas sensor, the noble metal nanoparticles are at least one of gold nanoparticles, silver nanoparticles, platinum nanoparticles, and palladium nanoparticles.

Preferably, the noble metal nanoparticles are gold nanoparticles.

In an embodiment of the present disclosure, the thickness of the noble metal nanoparticle modification layer is 1-10 nm.

In an embodiment of the present disclosure, in the semiconductor gas-sensitive material layer of the gas sensor, the semiconductor gas-sensitive material is at least one of ZnO, $TiO_2$, $WO_3$, $SnO_2$ and $In_2O_3$.

Preferably, the semiconductor gas-sensitive material is zinc oxide nanotetrapods.

In an embodiment of the present disclosure, the substrate of the probe of the gas sensor is prepared from at least one of ceramic, silicon wafer, plastic, or glass.

Preferably, the substrate of the probe of the gas sensor is a ceramic tube.

More preferably, the substrate of the probe of the gas sensor is an alumina ceramic tube.

It can be understood that the alumina ceramic tube is only a specific substrate of the probe of the gas sensor adopted in an embodiment of the present disclosure, and other ceramic tubes or substrates made of other materials are not excluded. The gas sensor of the present disclosure is not limited to using ceramic tubes or alumina ceramic tube substrates.

Due to the above technical solutions, the beneficial effects of the present disclosure are as follows:

The method for increasing gas selection functions of a multifunctional gas sensor is achieved by modifying the surface of the semiconductor gas-sensitive material layer with the noble metal nanoparticles, enhancing the gas selectivity of the gas sensor and expanding the types of gas it can select; thereby achieving selectively detection of at least three gases in the operating temperature range of 0-400° C., providing a new approach for preparing multi-functional gas sensors with more gas selection functions.

DETAILED DESCRIPTION

The present disclosure will be further described in detail below through specific embodiments with reference to the accompanying drawings. Many details described in the following embodiments are for better understanding the present disclosure. However, those skilled in the art can realize with minimal effort that some of these features can be omitted in different cases or be replaced by other elements, materials and methods. For clarity some operations related to the present disclosure are not shown or illustrated herein so as to prevent the core from being overwhelmed by excessive descriptions. For those skilled in the art, such operations are not necessary to be explained in detail, and they can fully understand the related operations according to the description in the specification and the general technical knowledge in the art.

There exists a problem of cross-sensitivity for an existing gas sensor in detecting multi-component mixed gases, that is, the gas sensor not only responds to a target gas, but also responds to other non-target gases. This directly affects the detection specificity of the gas sensor.

However, the inventor of this application utilizes the defect that the gas sensor responds to multiple gases for studying and optimizing the surface modification of the semiconductor gas-sensitive material layer. Specifically, the surface of the semiconductor gas-sensitive material layer is modified using a noble metal nanomaterial layer, so that the gas sensor is capable of having the strongest response to different gases at different temperatures; thus breaking through the limitation that existing gas sensors can only achieve dual function gas selectivity, allowing the gas sensor in the present disclosure to be able to selectively detect at least three types of gas even with a single probe. Moreover, the three types of gas can be selected at an operating temperature range of 0-400° C. which is relatively low, resulting in low energy consumption and high safety.

Based on the above research and understanding, a method for increasing gas selection functions of a multifunctional gas sensor is creatively proposed in the present disclosure. The method may include forming a noble metal nanomaterial modification layer on a surface of the semiconductor gas-sensitive material layer of a probe of the gas sensor, such that selectively detection of at least three gases in the operating temperature range of 0-400° C. can be achieved by the gas sensor with only a single probe.

Also a gas sensor including a probe of the gas sensor is proposed, wherein the substrate of the probe of the gas sensor is coated with a semiconductor gas-sensitive material layer, and the surface of the semiconductor gas-sensitive material layer has a noble metal nanoparticle modification layer.

The method and the gas sensor disclosed in the present disclosure can achieve selectively detection of at least three gases in the operating temperature range of 0-400° C. by using only a single probe; thereby improving the gas selectivity of the gas sensor and expanding the types of gas it can selectively detect.

The following specific examples and figures provide further details of the present disclosure. The following examples are only used to further illustrate the present disclosure and should not be construed as limiting the present disclosure.

Example 1

In this example in which zinc oxide nanotetrapods is used as the semiconductor gas-sensitive material, the influences of modification and non-modification with gold nanoparticles for the gas sensor are compared and analyzed. The substrate of the gas sensor is made of an alumina ceramic tube. The specific experiment thereof is as follows:

I. Preparation of Gas Sensor

1. Preparation of Zinc Oxide Nanotetrapods

In this example, 1g of a zinc sheet is placed in a quartz tube with a length of 10 cm and an inner diameter of 4 mm, placed in the center of a tube furnace. One end of the tube furnace is filled with 400 sccm of nitrogen, and the other end of the tube furnace is filled with 50 sccm of oxygen flowing through the other end. The oxygen passes through water before entering the tube furnace. The center temperature of the tube furnace is 750° C., and it is burned for 20 minutes. White floccular zinc oxide can be collected at the oxygen inlet end to obtain zinc oxide nanotetrapods.

2. Preparation of a Zinc Oxide Nanotetrapods-Based Gas Sensor 0.25 g of zinc oxide nanotetrapods is dissolved in 5 ml of terpineol to make a slurry, and then the slurry is applied to a ceramic tube electrode with a brush. The ceramic tube used in this example is an alumina ceramic tube. Two rings of gold electrodes are symmetrically arranged on the surface of the ceramic tube electrode, and the electrode is led out with platinum wire. The device is annealed at 500° C. for half an hour. The ceramic tube electrode is welded onto a base, and a resistance wire is inserted in the middle of the ceramic tube electrode to control the temperature. As such, a zinc oxide nanotetrapods-based gas sensor with zinc oxide nanotetrapods as a semiconductor gas-sensitive material layer is obtained.

3. Preparation of Zinc Oxide Nanotetrapods-Based Gas Sensor Modified by Gold Nanoparticles A zinc oxide nanotetrapods-based gas sensor modified by gold nanoparticles can be obtained by forming a gold nanoparticle modification layer on the surface of the semiconductor gas-sensitive material layer of the zinc oxide nanotetrapods-based gas sensor. A specific preparation method thereof is as follows:

Method 1: A gold film with a thickness of 5 nm is deposited on the surface of the semiconductor gas-sensitive material layer by magnetic sputtering, and then rapidly annealed at 500° C. for 3 minutes to form split gold nanoparticles, resulting in the zinc oxide nanotetrapods-based gas sensor modified by gold nanoparticles in this example.

Method 2: gold nanoparticles are synthesized using wet chemical methods. Specifically, 0.1 g of PVP are dissolved in 25 ml of DEG, and the solution is heated to 250° C. and refluxed for 5 minutes; 200 µL of chloroauric acid is dissolved in 1.8 ml of DEG, which is added to the boiling solution and refluxed for 10 minutes to prepare gold nanoparticles. The synthesized gold nanoparticles are taken out through a centrifuge and dispersed in ethanol to form a slurry; the prepared zinc oxide nanotetrapods-based gas sensor is immersed in the ethanol solution containing gold nanoparticles until the gas sensor is turned from white to pink, indicating that the gold nanoparticles have self-assembled onto the surface of the zinc oxide. In this example, the immersion may be conducted for 10 hours. Finally, the device is annealed at 500° C. for half an hour to obtain the zinc oxide nanotetrapods-based gas sensor modified by gold nanoparticles in this example.

This experiment confirms that both of the above methods can effectively prepare and obtain the zinc oxide nanotetrapods-based gas sensor modified by gold nanoparticles with comparable performance.

Figure 1:
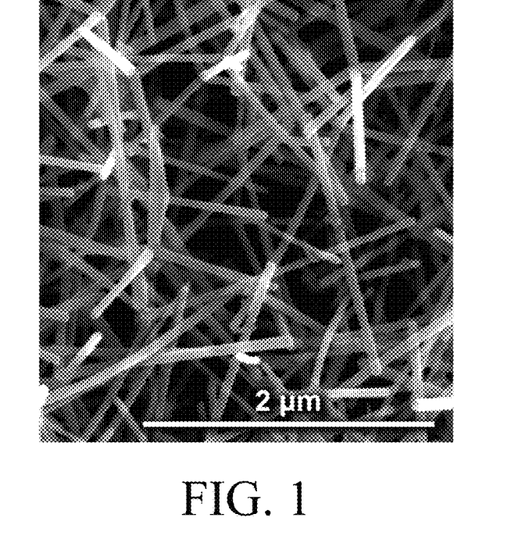
FIG. 1 is a scanning electron microscope image of the structure of zinc oxide nanotetrapods in an embodiment of the present disclosure.
Figure 4:
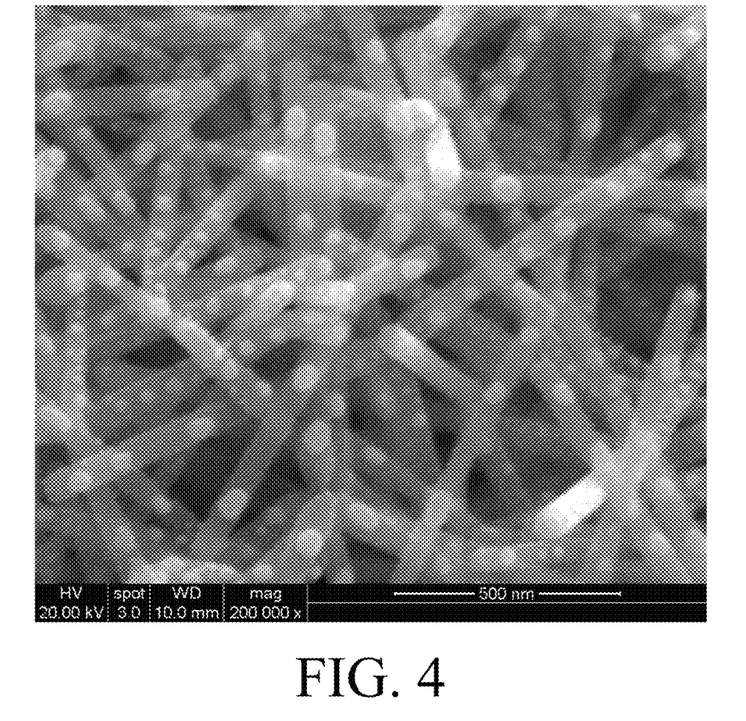
FIG. 4 is a scanning electron microscope image of a structure of zinc oxide nanotetrapods modified with gold nanoparticles in an embodiment of the present disclosure.

FIG. 1 shows an observed result of a zinc oxide nanotetrapod structure on the surface of the zinc oxide nanotetrapods-based gas sensor by using a scanning electron microscope; and FIG. 4 shows an observed result of surface modification of gold nanoparticles on a zinc oxide nanotetrapod structure on the surface of the zinc oxide nanotetrapods-based gas sensor modified by gold nanoparticles. The results in FIG. 1 and FIG. 4 are consistent with expectations.

II. Performance Test of a Gas Sensor

In this example, we test the zinc oxide nanotetrapods-based gas sensor and the zinc oxide nanotetrapods-based gas sensor modified by gold nanoparticles, that is, the gas sensor directly prepared by using a semiconductor gas-sensitive material layer and the gas sensor with a surface of the semiconductor gas-sensitive material layer having a noble metal nanomaterial modification layer, respectively, and compare and analyze the influence of the noble metal nanomaterial modification layer on the gas sensor. The details are as follows:

The gas sensor is tested with WS-30B, a test equipment provided by Henan Hanwei Electronic Technology Company. The prepared gas sensor is placed on the testing base of WS-30B, and applied with a 5V testing voltage to test the resistance of the gas sensor.

During the test of the resistance, air is introduced for 4 minutes first to obtain stable resistance of the gas sensor in the air; then 500 ppm ethanol gas is introduced for 4 minutes to obtain the response curve and stable resistance of the gas sensor to the ethanol gas; and air is introduced for 4 minutes again to obtain the resistance recovery curve of the gas sensor after the ethanol gas is removed, and the resistance of the gas sensor returns to the initial resistance of the device in the air. Next, 500 ppm methanol gas is introduced for 4 minutes to obtain the response curve and stable resistance of the gas sensor, then air is supplied for 4 minutes to obtain the resistance recovery curve of the gas sensor after the methanol gas is removed, and the resistance of the gas sensor returns to the initial resistance of the device in the air. Then, 500 ppm acetone gas is introduced for 4 minutes to obtain the response curve and stable resistance of the gas sensor, and air is supplied for 4 minutes to obtain the resistance recovery curve of the gas sensor after the acetone gas is removed, and the resistance of the gas sensor returns to the initial resistance of the device in the air. 500 ppm formaldehyde gas is then introduced for 4 minutes to obtain the response curve and stable resistance of the gas sensor to formaldehyde gas; air is introduced for 4 minutes to obtain the resistance recovery curve of the gas sensor after the formaldehyde gas is removed, and the resistance of the gas sensor returns to the initial resistance of the device in the air.

At this point, the resistance change curves of the gas sensor response to ethanol, methanol acetone, and formaldehyde gases are obtained, and response of the gas sensor to the four gases is calculated. In this example, the measurement process is repeated for cases that the temperature of the device is controlled at room temperature (about 25° C.), 100° C., 200° C., 260° C., 300° C., 340° C. and 400° C., respectively, to obtain the resistance change curves of the gas sensor response to the four gases at these temperatures, and the response sensitivity at the corresponding temperature is calculated.

Figure 2:
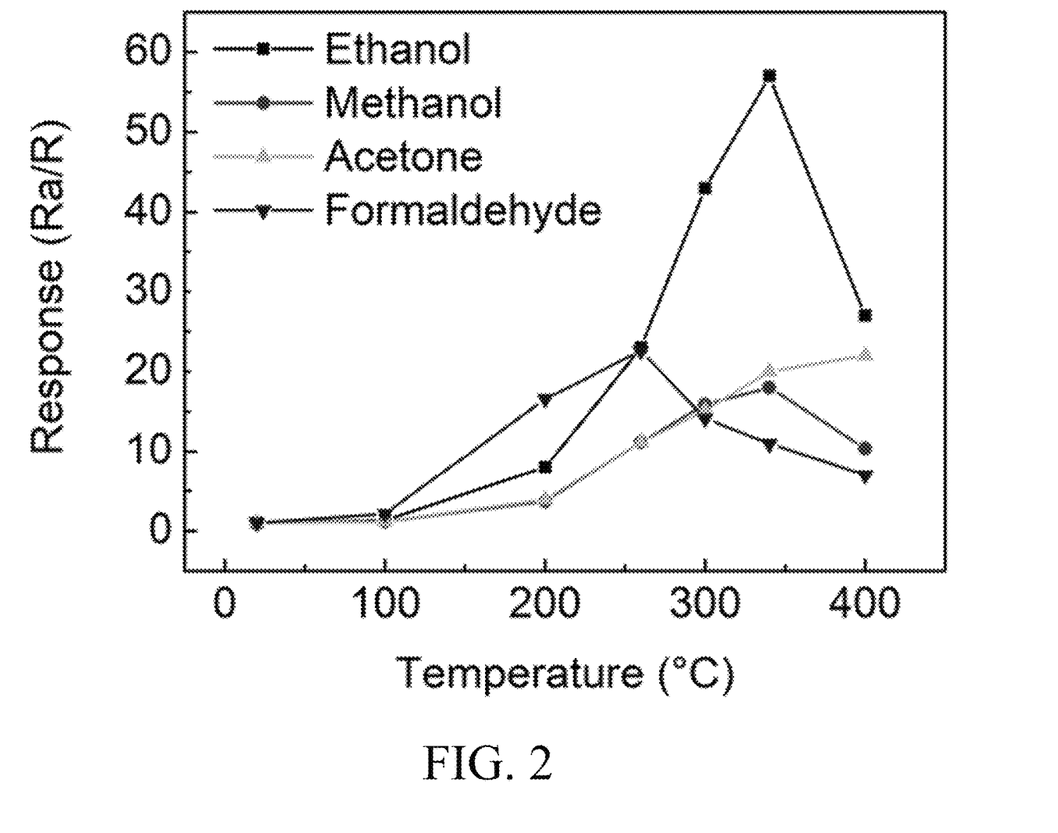
FIG. 2 is a comparative graph of test results of response to different gases by a zinc oxide nanotetrapods-based gas sensor in an embodiment of the present disclosure.
Figure 3:
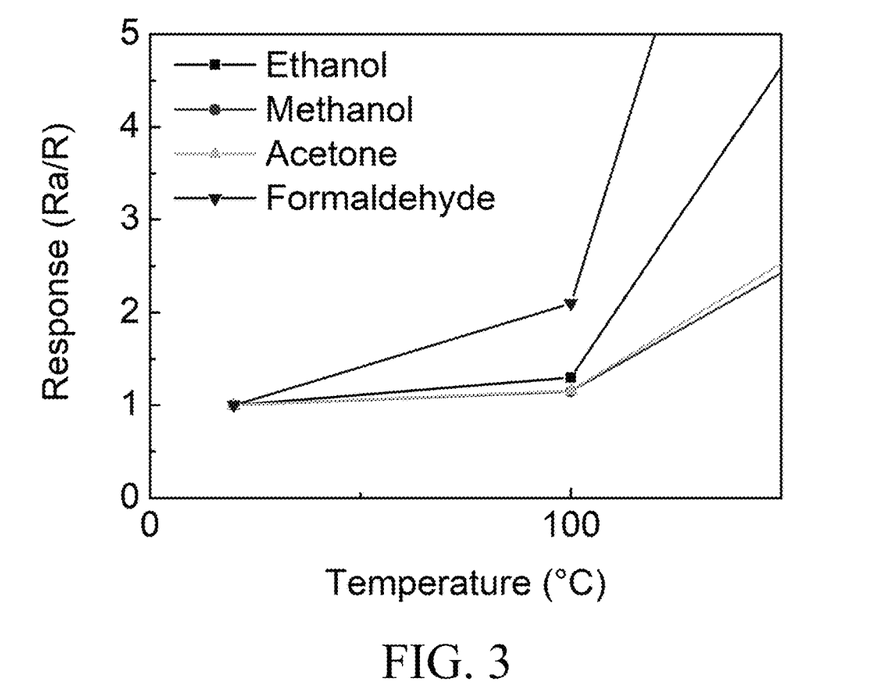
FIG. 3 is a partially enlarged diagram of a comparative graph of test results of response to different gases by a zinc oxide nanotetrapods-based gas sensor in an embodiment of the present disclosure.
Figure 5:
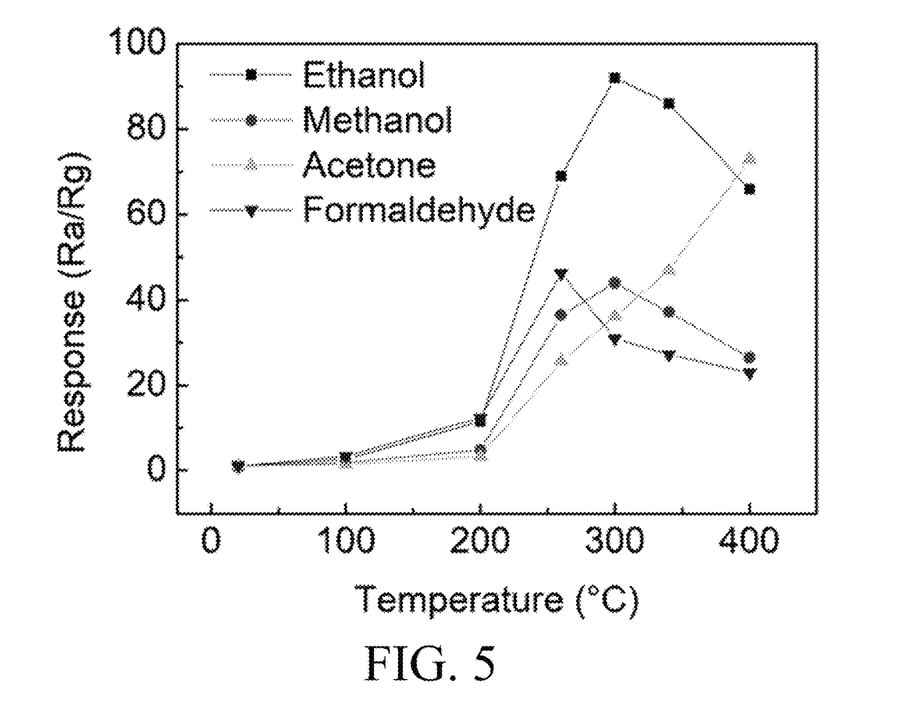
FIG. 5 is a comparative graph of test results of response to different gases by a zinc oxide nanotetrapods-based gas sensor modified with gold nanoparticles in an embodiment of the present disclosure.
Figure 6:
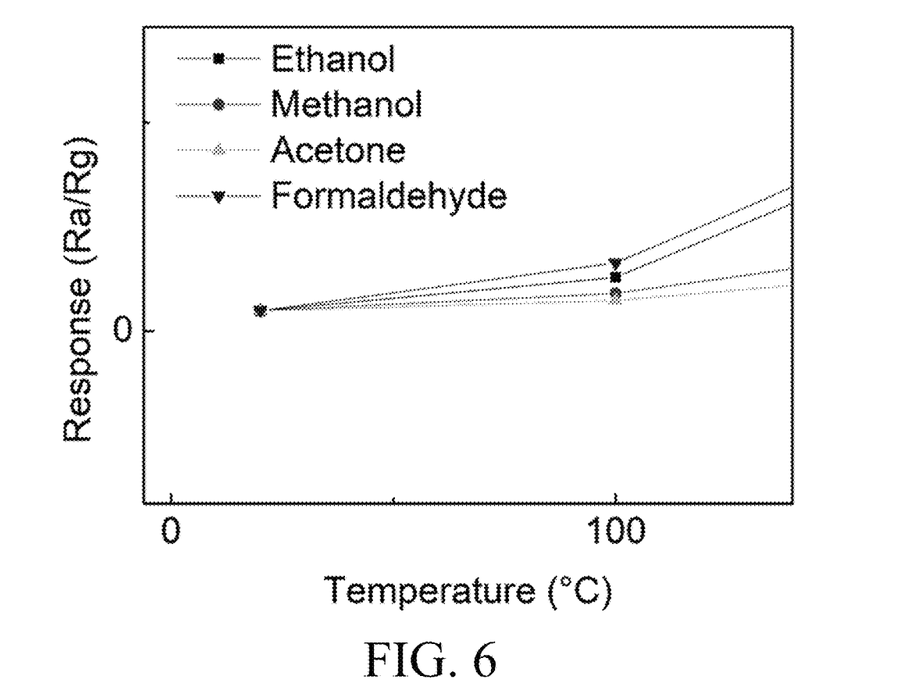
FIG. 6 is a partially enlarged diagram of a comparative graph of test results of response to different gases by a zinc oxide nanotetrapods-based gas sensor modified with gold nanoparticles in an embodiment of the present disclosure.

The response curves of the zinc oxide nanotetrapods-based gas sensor to ethanol, formaldehyde, methanol and acetone are shown in FIG. 2 and FIG. 3. The response curves of the zinc oxide nanotetrapods-based gas sensor modified by gold nanoparticles prepared by Method 2 to ethanol, formaldehyde, methanol and acetone are shown in FIG. 5 and FIG. 6. The performance of the zinc oxide nanotetrapods-based gas sensor modified by gold nanoparticles prepared by Method 1 is the same as that of the zinc oxide nanotetrapods-based gas sensor modified by gold nanoparticles prepared by Method 2, which will not be repeated here. FIG. 2 is a total response curve diagram of the zinc oxide nanotetrapods-based gas sensor to the four gases, and FIG. 3 is an enlarged display of a part thereof below 200° C. FIG. 5 is a total response curve diagram of the zinc oxide nanotetrapods-based gas sensor modified by gold nanoparticles to the four gases, and FIG. 6 is an enlarged display of a part thereof below 200° C. Since the response of the latter part in the overall response curve diagram is too high and the former part fails to show a distinguish difference in the overall curve diagram, the response curve diagram of the former part is provided in this example, namely FIG. 3 and FIG. 6.

The results in FIG. 2 and FIG. 3 show that the zinc oxide nanotetrapods-based gas sensor has the highest and best response to formaldehyde below 260° C., and the highest response and selectivity to ethanol above 260° C. The zinc oxide nanotetrapods-based gas sensor can only selectively detect formaldehyde and ethanol within the range of 0-400° C.

The results in FIG. 5 and FIG. 6 show that the zinc oxide nanotetrapods-based gas sensor modified by gold nanoparticles has the highest response to formaldehyde below 200° C., the highest response to ethanol between 200° C. and 340° C., and the highest response to acetone at 400° C. It can be seen that the gas selection function of the zinc oxide nanotetrapods-based gas sensor modified by gold nanoparticles has expanded from two types of gas (ethanol and formaldehyde) to three types of gas (ethanol, formaldehyde, acetone), that is, the zinc oxide nanotetrapods-based gas sensor modified by gold nanoparticles is capable of selectively detect three types of gas: ethanol, formaldehyde, and acetone.

The results in FIGS. 2-3 and FIGS. 5-6 show that, as the temperature increases, both a pure zinc oxide nanotetrapods and a zinc oxide nanotetrapods modified with gold nanoparticles may have a response of first increasing and then decreasing to ethanol, methanol, and formaldehyde and a response of always increasing to acetone. With regard to a temperature between 0-400° C., the zinc oxide nanotetrapods structure modified with gold nanoparticles may show a higher response sensitivity to formaldehyde, ethanol, and acetone than the other three gases, successively and respectively, indicating better selectivity; while a device made of the pure zinc oxide nanotetrapods structure exhibits better selectivity only to formaldehyde and ethanol. Therefore, it is shown that the types of gas selected by the zinc oxide nanotetrapods structure can be increase through gold nanoparticles, and a three-selective gas sensor can be obtained at the same temperature range of 0-400° C.

Figure 7:
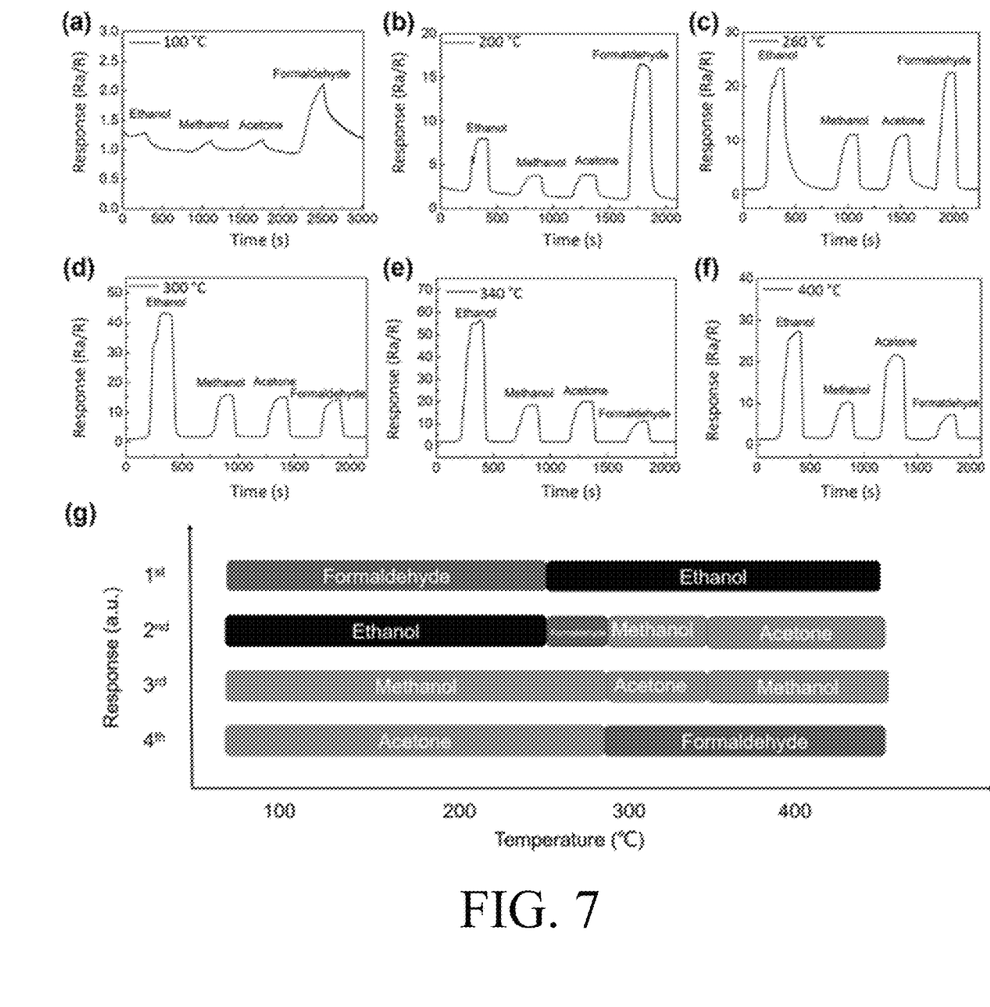
FIG. 7 is measured response curves of a comparative test to a zinc oxide nanotetrapods-based gas sensor in an embodiment of the present disclosure.

FIG. 7 shows a measured response curve of the zinc oxide nanotetrapods-based gas sensor. In FIG. 7, (a) shows a measured response curve at 100° C., (b) shows a measured response curve at 200° C., (c) shows a measured response curve at 260° C., (d) shows a measured response curve at 300° C., (e) shows a measured response curve at 340° C., (f) shows a measured response curve at 400° C., and (g) shows a response ranking from low to high. From FIG. 7, it can also be seen that, before and after 260° C., the zinc oxide nanotetrapods-based gas sensor exhibits the highest response sensitivity to formaldehyde and ethanol, respectively; and the pure zinc oxide nanotetrapods structure only has selectivity for formaldehyde and ethanol between 0-400° C.

Figure 8:
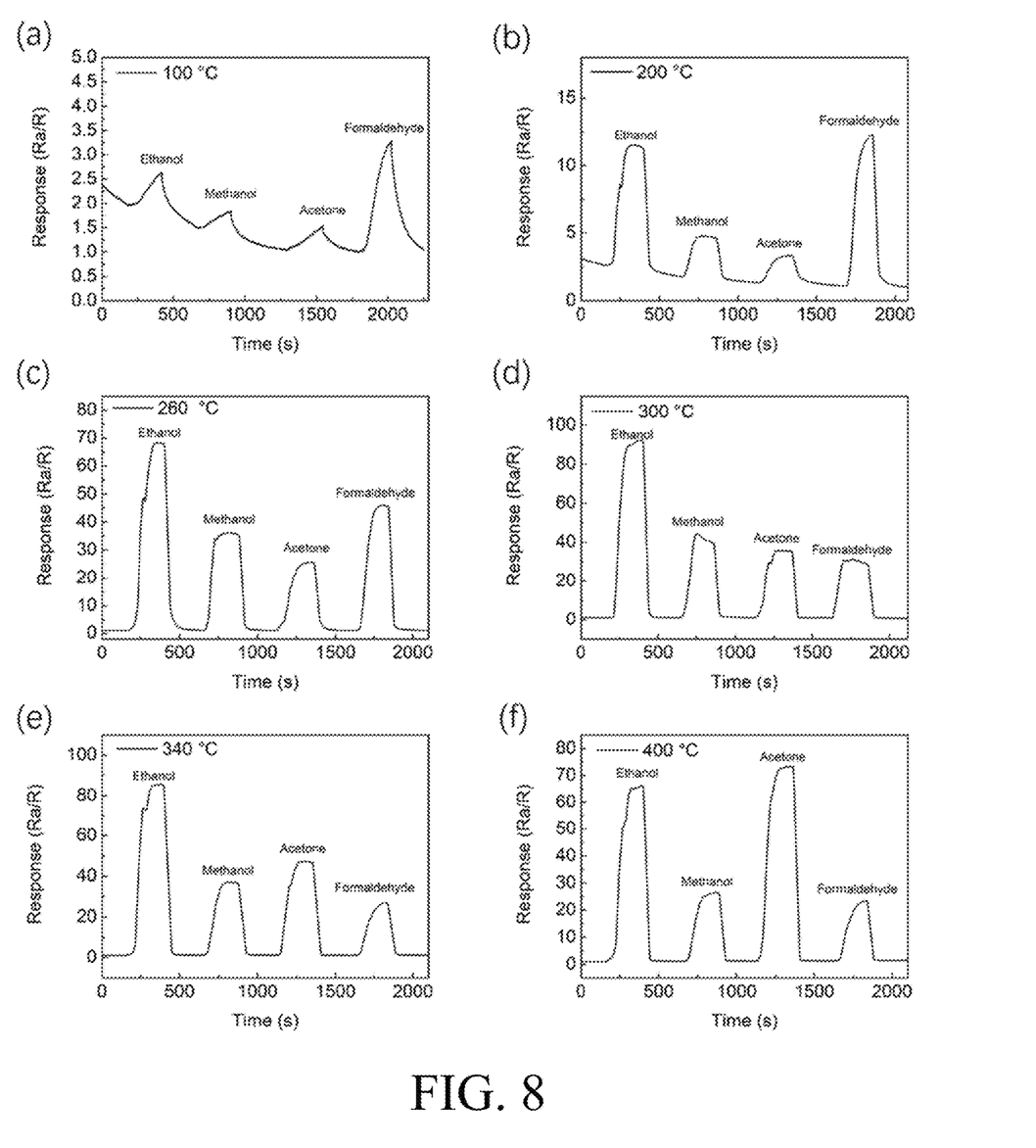
FIG. 8 is measured response curves of a zinc oxide nanotetrapods-based gas sensor modified with gold nanoparticles in an embodiment of the present disclosure.
Figure 9:
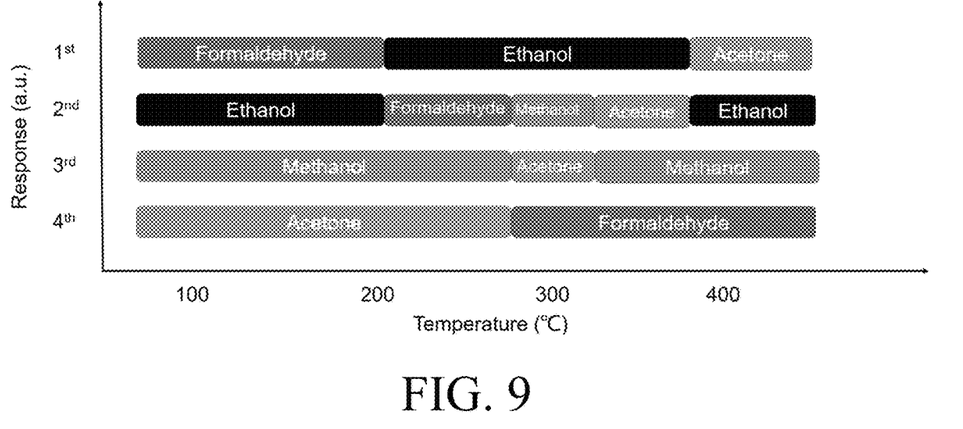
FIG. 9 is a diagram showing the change of gas selectivity of a zinc oxide nanotetrapods-based gas sensor modified with gold nanoparticles in an embodiment of the present disclosure.

FIG. 8 and FIG. 9 show measured response curves of the zinc oxide nanotetrapods-based gas sensor modified by gold nanoparticles. In FIG. 8, (a) shows a measured response curve at 100° C., (b) shows a measured response curve at 200° C., (c) shows a measured response curve at 260° C., (d) shows a measured response curve at 300° C., (e) shows a measured response curve at 340° C., and (f) shows a measured response curve at 400° C. FIG. 9 shows variations of gas selectivity of the zinc oxide nanotetrapods-based gas sensor modified by gold nanoparticles. From FIG. 8 and FIG. 9, it can be seen that the zinc oxide nanotetrapods-based gas sensor modified by gold nanoparticles exhibits the highest response (i.e. showing selectivity) to formaldehyde gas below 200° C., the highest response (i.e. showing selectivity) to ethanol between 260° C. and 340° C., and the highest response (i.e. showing selectivity) to acetone at 400° C. Accordingly, it can be seen that the zinc oxide nanotetrapod structure modified with gold nanoparticles has selectivity for formaldehyde, ethanol and acetone between 0-400° C.

Based on the above tests and analysis, it can be seen that the gas selection function of the multi-functional gas sensor can be increased by forming a gold nanoparticle modification layer on the surface of the semiconductor, that is, the gas-sensitive material layer on the substrate of the probe of the gas sensor. gas sensor can selectively detect three types of gas at an operating temperature range of 0-400° C. with only a single probe.

It should be noted that although the surface of the semiconductor gas-sensitive material layer is modified with gold nanoparticles in this example, it can be expected that other similar noble metal nanoparticles, such as silver nanoparticles, platinum nanoparticles, and palladium nanoparticles, can also play a similar role in increasing the gas selection function of a multifunctional gas sensor.

In this example, the principle that the zinc oxide nanotetrapods-based gas sensor modified by gold nanoparticles is capable of selectively detecting three types of gas is deeply analyzed, and it is found that the reason why using the method disclosed in the present application can selectively detect three types of gas is that the surface of the semiconductor gas-sensitive material is modified with gold nanoparticles which can reduce the reaction activation energy of the gas on the surface of the gas-sensitive material, thus enabling the gas sensor to exhibit high response performance at lower temperatures. Therefore, by modifying gold nanoparticles on the surface of the semiconductor gas-sensitive material, the effect of detecting gas can be similar to that of increasing working temperature.

Based on the above analysis, it can be expected that other noble metal nanoparticles similar to gold nanoparticles, such as silver nanoparticles, platinum nanoparticles and palladium nanoparticles, can also have the same or comparable technical effects as the modification of gold nanoparticles in this example, except that the specific operating temperature or optimal response temperature may vary. However, it can be expected that the use of other noble metal nanomaterials will also inevitably conform to the rules of this example, such as the highest response to formaldehyde at low temperatures, the highest response to ethanol as the temperature increases, and finally, the highest response to acetone; and it can be expected that the operating temperature range is also between 0-400° C., such as 0-300° C., 0-350° C., or 0-400° C.

It can be understood that the contribution of this experiment relative to the prior art is that the study found that the gas selection function of the multi-functional gas sensor can be increased by forming a noble metal nanoparticle modification layer on the surface of the semiconductor gas-sensitive material layer on the substrate of the gas sensor, which enables the gas sensor with a single probe can achieve selective detection of three types of gas within the operating temperature range of 0-400° C. As for the specific semiconductor gas-sensitive material, it can be the zinc oxide nanotetrapods mentioned in this experiment, or other structures of zinc oxide, or other common semiconductors used to make gas sensors, such as $TiO_2$, $WO_3$, $SnO_2$, $In_2O_3$, etc. It can be expected that other structures of zinc oxide or other semiconductor materials, such as $TiO_2$, $WO_3$, $SnO_2$, $In_2O_3$, can achieve the effect of increasing the gas selection function of the multi-functional gas sensor as long as the surface is modified with noble metal nanoparticles. And the specific selection of different semiconductors may affect the operating temperature or optimal response temperature. Similarly, it can be expected that even if different semiconductor materials are used, they will inevitably comply with the rules of this example, such as the highest response to formaldehyde at low temperatures, the highest response to ethanol as the temperature increases, and finally the highest response to acetone.

The above content is a further detailed explanation of the present application in combination with specific implementation methods, and it cannot be determined that the specific implementation of the present application is limited to these explanations. For those of ordinary skill in the art to which the present application belongs, several simple deductions or substitutions can be made without departing from the concept of the present application.

The invention claimed is:

1. A method for increasing gas selection functions of a multifunctional gas sensor, comprising: forming a noble metal nanoparticle modification layer on a surface of a semiconductor gas-sensitive material layer of a probe of a gas sensor, such that a single probe of the gas sensor is capable of implementing selectively detection of at least three gases in an operating temperature range of 0-400° C.;
   wherein the noble metal nanoparticles are gold nanoparticles, a thickness of the noble metal nanoparticle modification layer is 1-10 nm, the at least three gases comprise formaldehyde, ethanol and acetone;
   wherein the selectively detection of at least three gases in the operating temperature range of 0-400° C. comprises: selectively detecting formaldehyde, ethanol and acetone by using characteristics of a highest response to a certain gas at different operating temperatures by the gas sensor, the characteristics including a highest response to formaldehyde at an operating temperature below 200° C. by the gas sensor, a highest response to ethanol at an operating temperature between 200° C. and 340° C. by the gas sensor and a highest response to acetone at an operating temperature range of 400° C. by the gas sensor; and
   wherein the noble metal nanoparticle modification layer is prepared using any of following methods:
   (1) depositing a 1-10 nm noble metal film on the surface of the semiconductor gas-sensitive material layer by using magnetic sputtering, and rapidly annealing at high temperature to form split noble metal nanoparticles, thereby obtaining the noble metal nanoparticle modification layer; or,
   (2) soaking the probe of the gas sensor coated with the semiconductor gas-sensitive material layer in an ethanol suspension of the noble metal nanoparticles for at least 10 hours to allowing the noble metal nanoparticles to self-assemble onto the surface of the semiconductor gas-sensitive material layer, and heating to remove water and organic matter, thereby obtaining the noble metal nanoparticle modification layer;
   wherein the semiconductor gas-sensitive material is zinc oxide nanotetrapods.

2. The method according to claim 1, wherein a substrate of the probe of the gas sensor is prepared from at least one of ceramic, silicon wafer, plastic or glass.

3. The method according to claim 2, wherein the substrate of the probe of the gas sensor is an alumina ceramic tube.

* * * * *